US009767689B1

(12) United States Patent
Cain et al.

(10) Patent No.: US 9,767,689 B1
(45) Date of Patent: Sep. 19, 2017

(54) METHODS AND SYSTEMS FOR INCREASING VEHICULAR SAFETY

(71) Applicant: Cisco Technology, Inc., San Jose, CA (US)

(72) Inventors: Harel Cain, Jerusalem (IL); Michal Devir, Haifa (IL); Yaron Sella, Beit Nekofa (IL); Alexander Kreines, Jerusalem (IL)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/072,378

(22) Filed: Mar. 17, 2016

(51) Int. Cl.
G08G 1/16 (2006.01)
G08G 1/0967 (2006.01)

(52) U.S. Cl.
CPC .............................. *G08G 1/096791* (2013.01)

(58) Field of Classification Search
CPC ....... G08G 1/096791; G08G 1/096766; G08G 1/096741; G08G 1/0967; G08G 1/0962; G08G 1/164; B60W 40/09; G06Q 40/08
USPC ................. 340/901–903, 439; 348/148–149; 701/300, 301; 705/4
See application file for complete search history.

(56) References Cited

U.S. PATENT DOCUMENTS

| 6,392,564 | B1 |   | 5/2002 | Mackey et al. |
| 7,697,028 | B1 | * | 4/2010 | Johnson ........... G08B 13/19619 348/113 |
| 9,147,353 | B1 | * | 9/2015 | Slusar ................. G08G 1/0112 |
| 2009/0132294 | A1 | * | 5/2009 | Haines .................. G06Q 40/08 705/4 |
| 2010/0106557 | A1 |   | 4/2010 | Buss |
| 2010/0157061 | A1 | * | 6/2010 | Katsman ............. G07C 5/0866 348/149 |
| 2012/0066007 | A1 | * | 3/2012 | Ferrick .................. G06Q 40/08 705/4 |
| 2014/0222323 | A1 |   | 8/2014 | Purushothaman et al. |

FOREIGN PATENT DOCUMENTS

| EP | 001431946 | 6/2004 |
| WO | WO2012/010731 | 1/2012 |
| WO | WO2013/150557 | 10/2013 |

OTHER PUBLICATIONS

CV Pilots Deployment Project (Jun. 24, 2015)—US Department of Transportation Can be seen at: http://www.its.dot.gov/pilots/CV_pilot_plan.htm.

(Continued)

Primary Examiner — Thomas Mullen
(74) Attorney, Agent, or Firm — Samuel M. Katz

(57) ABSTRACT

A method, system and apparatus are described, the method, system, and apparatus, in one embodiment including assigning at a processor an initial driving score S(V) to a vehicle which is being driven, receiving a report at a communication system controlled by the processor, the report including a report of a reckless driving incident in a vicinity of a receiver disposed in the vehicle, incrementing S(V) by the processor upon receipt of the report of the reckless driving incident, decreasing S(V) by the processor for every unit of driving the vehicle is driven, broadcasting the value of S(V) to other vehicles by the communication system controlled by the processor. Related methods, systems and apparatuses are also described.

20 Claims, 6 Drawing Sheets

(56) References Cited

OTHER PUBLICATIONS

Pyke, Marni; Connected cars' that alert each other, you could be tested on I-90, Daily Herald Article (Feb. 18, 2015) Can be seen at: http://www.dailyherald.com/article/20150218/news/150218750/.

Shellem, Michael D.: Aggressive Driver Imaging System (ADIS)—Security—Case Study (2015) can be seen at: http://www.matrox.com/imaging/en/press/feature/surveillance/aids/.

Shirazi, Mehran M.; Detection of Intoxicated Drivers Using Online System Identification of Steering Behavior, Intelligent Transportation Systems, IEEE Transactions on , vol. 15, No. 4, pp. 1738, 1747, Aug. 2014.

Srinivasan, Avinash; DRBTS: Distributed Reputation-Based Beacon Trust System, in Dependable Autonomic and Secure Computing, 2nd IEEE International Symposium on , vol., No., pp. 277-283, Sep. 29, 2005-Oct. 1, 2006.

US Department of Transportation; Connected Vehicle Pilot Deployment Program (2015) Can be seen at: http://web.archive.org/web/20150906013346/http://www.its.dot.gov/factsheets/pdf/JPO_CVPilot_v3.pdf.

Vandenberg, Stacey; Lebanese Drivers Shamed into Adopting Better Driving through Crowdsourcing (2015) Can be seen at: http://dailycrowdsource.com/content/crowdsourcing/695-lebanese-drivers-shamed-into-adopting-beter-driving-habits-through-crowdsourcing.

Wikipedia; Reputation System (2015) can be seen at: https://en.wikipedia.org/wiki/Reputation_system.

* cited by examiner

METHODS AND SYSTEMS FOR INCREASING VEHICULAR SAFETY

TECHNICAL FIELD

The present disclosure generally relates to methods and systems for increasing vehicular safety.

BACKGROUND

Drivers who drive recklessly and aggressively endanger the lives of others on the road, but drivers who are not driving recklessly have, at the present time, no effective means to report on this behavior, although it lies in their best interest to do so.

Vehicular communication systems are a type of network where vehicles and roadside units are the communicating nodes providing each other with information, such as safety warnings and traffic information. Typical vehicular communication systems utilize short range communication devices and support both private data communications (i.e. unicast, vehicle-to-vehicle, V2V) and public communications (i.e. broadcast to all vehicles on the network or in a given region). In practice, on the physical level, V2V is typically broadcast. On the logical level, however, the message can be addressed to a specific vehicle based on ID or location.

Systems in which driving information is collected at all times and transmitted over a cellular data connection to a central server where the collected information is analyzed for building driver profiles for, by way of example, the sake of Usage-Based Insurance (UBI) are known.

Reputation systems are well known systems for computing and publishing reputation scores for a set of objects (e.g. service providers, services, goods or entities) within a community or domain, based on a collection of opinions that other entities hold about the objects. The opinions are typically passed as ratings to a central place where all perceptions, opinions and ratings can be accumulated. A reputation center uses a specific reputation algorithm to dynamically compute the reputation scores based on the received ratings. Reputation is a sign of trustworthiness manifested as testimony by other people.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

A method, system and apparatus are described. The method, system, and apparatus, in one embodiment include assigning at a processor an initial driving score S(V) to a vehicle V which is being driven, receiving a report at a communication system controlled by the processor, the report including a report of a reckless driving incident in a vicinity of a receiver disposed in the vehicle V, incrementing S(V) by the processor upon receipt of the report of the reckless driving incident, decreasing S(V) by the processor for every unit of driving the vehicle V is driven, broadcasting the value of S(V) to other vehicles by the communication system controlled by the processor. Related methods, systems and apparatuses are also described.

Exemplary Embodiments

Figure 1:
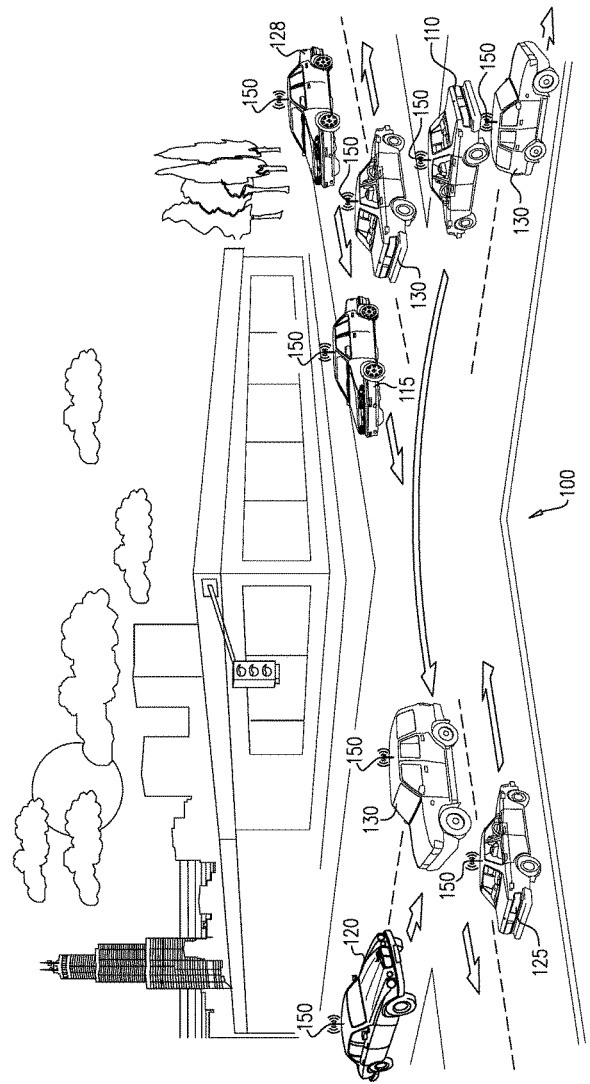
FIG. 1 is a simplified pictorial illustration of vehicles travelling on a city street, the vehicles comprising a system for enhanced vehicular safety constructed and operative in accordance with an embodiment of the present invention.

Reference is now made to FIG. 1, which is a simplified pictorial illustration of vehicles travelling on a city street, the vehicles comprising a system for enhanced vehicular safety constructed and operative in accordance with an embodiment of the present invention. It is appreciated that the description herein refers to automotive vehicles by way of example only. The present invention, may, in embodiments thereof, be implemented in boats and yachts, mobile robots, and so forth.

In FIG. 1, a first vehicle 110 is turning left into a busy intersection 100. Other vehicles, such as vehicles 115, 120, 125, 128 are approaching and/or about to enter the busy intersection 100. Still other vehicles, such as vehicles 130 may have just finished driving through the busy intersection 100. Each of the vehicles 110, 115, 120, 125, 128, 130 is equipped with various systems which will be described below, with reference to FIG. 2.

Among these systems are vehicle-to-vehicle (V2V) communication systems. V2V systems are coming into more widespread use, and this trend is continuing. Each of the vehicles 110, 115, 120, 125, 128, 130 in FIG. 1 is, accordingly, depicted as having an antenna 150, the antenna 150 being a part of each vehicle's V2V system. Accordingly, as V2V systems become more widespread, it is becoming possible to take advantage of such communications in order to improve road safety.

Figure 2:
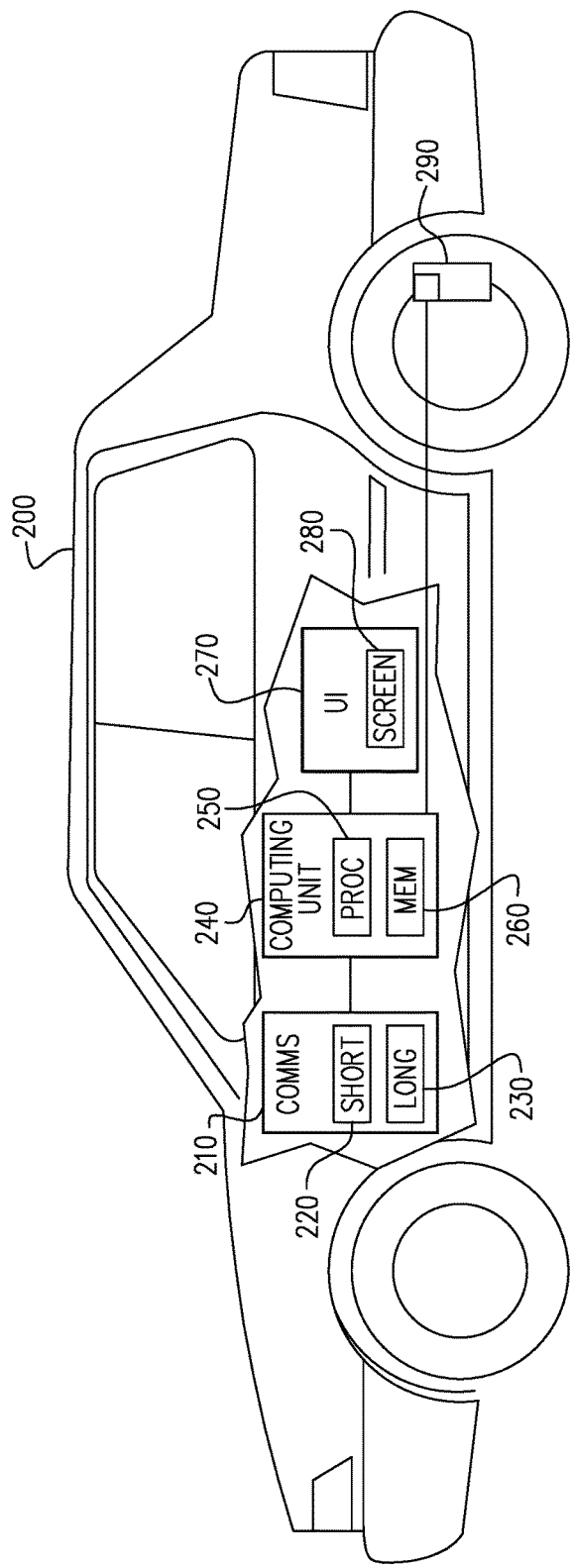
FIG. 2 is a partly pictorial, partly block diagram illustration of an embodiment of one vehicle in the system of FIG. 1.

Reference is now made to FIG. 2, which is a partly pictorial, partly block diagram illustration of an embodiment of a vehicle 200 in the system of FIG. 1. The vehicle 200 may be any of the vehicles 110, 115, 120, 125, 128, 130 mentioned above with reference to FIG. 1. The vehicle 200 will typically support a variety of communication options 210. Typical V2V communication systems, such as those described above with reference to FIG. 1, are short range communications systems 220.

As is known in the art, V2V systems may be based on various technologies such as DSRC (802.11p), Bluetooth, WiFi or others. DSRC communication is an emerging technology being actively introduced into the automotive industry in current automotive model years.

The vehicle 200 may be connected to at least one central server (discussed below in FIG. 4) by a long range communication system 230, which typically incorporates wireless communication apparatus such as LTE modems ("Long Term Evolution" modems, for wireless data communications technology are a development of the GSM/UMTS telecommunications standards). The at least one central server may have access to information about the location of vehicles, which use Global Navigation Satellite System (GNSS) signal units in their telematics systems (not shown) and/or cellular phones to determine their location and then to report that location to the at least one central server. LTE modems and built-in GNSS units are becoming more widespread in vehicles as time goes on. Nevertheless, it is appreciated that in embodiments as described herein, it is not necessary for the at least one central server to keep track of the location of vehicle 200. As will be described below, vehicles may periodically report their accumulated driving scores to the central server.

The vehicle 200 also has a dedicated secure computing unit 240 for managing a driving score, which is generated as described below. A level of security of the secure computing unit 240 should be such as to prevent the vast majority of drivers from being able to tamper with the driving scores that have been calculated for them. Secure platforms such as hardware security modules (HSMs) are in use in many modern vehicles and are also typically used in forming security for intra-vehicle communications. As is known in the art, hardware security modules are physical computing devices that safeguard and manage digital keys for strong authentication and that provide cryptoprocessing.

The secure computing unit 240 comprises at least one processor (PROC) 250, and may comprise more than one processor 250. One of the processors 250 may be a special purpose processor operative to perform the methods for increasing vehicular safety as described herein below. In addition, the secure computing unit 240 comprises non-transitory computer-readable storage media (i.e. memory, MEM) 260. The memory 260 may store instructions, which at least one of the processors 250 may execute, in order to perform the method described herein below. The secure computing unit 240 may also comprise long term storage (not depicted), such as, but not limited to a hard disk drive or flash memory. Such long term storage is available for, among other purposes, the storing of information which might be needed or useful for the operation of the one of the processors 250.

Additionally, the vehicle 200 may optionally be equipped with a user interface (UI) 270 comprising a screen 280 (such as those used by on-board navigation devices) that allows displaying of positions of neighboring vehicles and their associated driving scores. The screen 280 might be a touch screen, as is known in the art. In some embodiments, the screen 280 might also allow for selecting one of the neighboring vehicles and reporting unsafe driving by the selected one of the neighboring vehicles. For example, a driver of vehicle 115 (FIG. 1) might use the screen 280 to select vehicle 110 (FIG. 1) and then report unsafe driving on the part of vehicle 110 (FIG. 1).

Furthermore, the vehicle 200 typically comprises various sensors, such as, but not limited to brake sensor 290, which may be in communication with the processor 250. By way of example, the brake sensor 290 may send periodic reports to the processor 250 concerning the use and status of the brakes of the vehicle 200. It is appreciated that the brake sensor 290 may be connected to the processor 250 via an intra-vehicle communication bus (such as the CAN bus, as is known in the art), from which data from various sensors that exist in the vehicle may be read and analyzed.

Returning now to the discussion of FIG. 1, as was mentioned above, the system of FIG. 1 is designed to derive a driving score, hereinafter designated S(V) for every vehicle, hereinafter designated V.

The driving score S(V) is based on mutual reporting of reckless driving incidents by drivers. The computation is typically distributed and not necessarily managed by a central server, although a central server can be used as well. The derivation of S(V) is now described.

Drivers who encounter reckless driving by other drivers in their vicinity report these incidents, without specifying which vehicle was driven recklessly, to all neighboring vehicles in a certain radius (for example, approximately the reception radius of the V2V antenna) using a broadcast message. For example, the driver of vehicle 115 might see the first vehicle 110 turning left into the busy intersection 100, and judge that this was an act of reckless driving on the part of the driver of the first vehicle 110. Accordingly, the driver of vehicle 115 would take an action to report this act.

The action taken to generate the report is typically a very simple action requiring minimal effort by the driver—such as pressing a button or giving a voice command. Thus the driver of vehicle 115 can safely perform the reporting action without being distracted from driving vehicle 115. The act of pressing the button or giving the voice command will invoke a routine resident in one of the processors 250 (FIG. 2) which will initiate the method described herein below.

As was mentioned above, in the discussion of FIG. 2, the vehicle which has committed an act of reckless driving might, in some embodiments, be specified when making the report. For example, the screen 280 or UI 270 of FIG. 2 might be used to single out the recklessly driving vehicle 110. Alternatively, other methods of specifying a vehicle which has committed an act of reckless driving, such as, for example, entering the license plate number of the vehicle into the UI 270, might be implemented. In an embodiment where the vehicle which has committed the act of reckless driving is specified, it may be necessary to ensure that the driver of the reporting vehicle is subject to few distractions. For example, there may only be a few other vehicles nearby.

In some embodiments, generation of the reports can be triggered fully automatically once the vehicle observes the reckless driving. By way of example, if the driver of vehicle 115 has to brake suddenly, then the sensor 290 (FIG. 2) may automatically trigger a report of unsafe driving. Similarly, if the sensor 290 (FIG. 2) senses that the driver of vehicle 115 is reacting to a dangerous passing situation, a report of unsafe driving may be automatically generated, and so forth. It is appreciated that the operators of the system for enhanced vehicular safety described herein may define which behaviors and thresholds measured by existing sensors (such as sensor 290 of FIG. 2) constitutes the reckless driving.

Driving Score S(V)

All neighboring vehicles in the vicinity of the reporting vehicle receive the report and process it so that their own score S(V) increases (it is assumed here that the higher the score, the worse the driving; of course this could be the other way around, and a lower score may be indicative of bad driving practices). Accordingly, the score S of vehicle V is updated, so that now S(V) is incremented to equal S(V)+P, with P a certain penalty amount. For example, in FIG. 1, after the driver of vehicle 115 reports the act of reckless driving on the part of vehicle 110, the driving score S(V) of all of the nearby vehicles 115, 120, 125, 128, 130 would be increased, as mentioned above. It is appreciated that the score S of the reporting vehicle 115 need not be incremented by the penalty amount P. In some embodiments, the score S of the reporting vehicle 115, may, instead, be incremented by the penalty amount P. As will be discussed below, however, the reputation of the reporting vehicle 115 will be effected by the report, in order to discourage over reporting.

In embodiments where the report of an incident of unsafe driving is directed at a single one of the neighboring vehicles, for instance, by using the screen 280 (FIG. 2), then the selected score of the selected vehicle will be incremented to S(V)+P, but the scores of other nearby unreported vehicles, will remain unchanged.

For every time unit (minute, hour, day, etc.) driven on the road, or alternatively every mile or kilometer driven on the road, the vehicle's score S(V) is decreased by a typically small amount T, so that now S(V) is decremented to equal S(V)−T. Typically, T<<P, forming a "leaking bucket" model. It is appreciated that many vehicles such as vehicles 120, 125, 128, 130 in the vicinity of the recklessly driven vehicle 110 will have their scores S incremented by the penalty amount P simply as a consequence of their having been in the vicinity of the recklessly driving vehicle 110. Accordingly, the use of the leaking bucket model enables the score S of the vehicles 120, 125, 128, 130 in the vicinity of the recklessly driving vehicle 110 to return to its base level. Nevertheless, if the driver of the recklessly driving vehicle 110 repeatedly commits acts of reckless driving, that vehicle's score will continue to accrue penalty points P.

The values of P and T may depend on the overall density of vehicles on the road, the likelihood of reckless driving to happen, the likelihood of drivers to report reckless driving, the radius of the V2V broadcast report and many other parameters. In a real world deployment these values will be calibrated using field trials to derive realistic values. Likewise, a real world setting may include more parameters (such as time of day, geographic region, etc.) and more complex dependencies between them. For example, and without limiting the generality of the foregoing, rather being fixed constants, P and T may become functions of such parameters, e.g. P(vehicle density, time of day, region), T(annual mileage of vehicle), and so forth.

It should also be noted that P and T need not necessarily be linearly added and subtracted from S(V) and might be applied according to other formulas. By way of example, and without limiting the generality of the foregoing, S(V) might be set equal to a value of S(V) before the act of reckless driving was reported*(1+P) [i.e., $S_{new}(V)=S_{old}(V)*(1+P)$]. Or, alternatively, S(V) might be set equal to a value of S(V) before the act of reckless driving was reported*(1+$P_1$)+$P_2$ [i.e., $S_{new}(V)=S_{old}(V)*(1+P_1)+P_2$], and so forth.

Reporting Reputation Score RR(V)

Embodiments described herein can be regarded as a reputation based system to calculate S(V) for every vehicle, V. In addition to the aforementioned driving score S(V), in some embodiments, an additional reputation based score can be computed by the system, i.e., Reporting Reputation RR(V) score. For example, vehicle 115 may have a driving score S(V) of 23 and a reporting reputation RR(V) of 12. By contrast, vehicle 110, for example, may have a driving score S(V) of 32 and a reporting reputation RR(V) of 6.

As noted above, the driving score represents the quality of a given driver's driving, say the driver of vehicle 115, as reflected by the reports collected in this system. The reporting reputation RR(V) reflects the quality of the given driver's reporting, and can be translated to how much weight is assigned to the given driver's reports. Additionally, RR(V) may also endow the given driver with reporting rights, i.e. the right to report (how often, how much). Accordingly, the higher a given vehicle's driver's reporting reputation, the more that particular driver's reports affect the driving score of other drivers. The lower the given vehicle's driver's reporting reputation, the less effect that driver's reports will have on the driving score of other drivers. Additionally and optionally, once a driver's reputation falls beneath a certain threshold, other vehicles ignore reports from that driver. The RR(V) score of a given vehicle may also increase over time, to compensate for loss of reputation when reporting incidences of unsafe driving.

RR(V) of the given driver can increase or decrease based on the S(V) scores of the vehicles in the vicinity of the given driver when a report is issued—if the vehicles in the vicinity all have low driving scores (i.e. the drivers in the local area are rated as careful drivers), then RR(V) should decrease as this may be a non-justified report.

For example, if the given driver provides more trustworthy reports, then the given driver may be allowed to report more often. Alternatively, if the given driver provides less trustworthy reports, then the given driver may be allowed to report less frequently. The processor 250 and the memory 260 (both of FIG. 2) may be used to track the RR(V) score of the vehicle 200 (FIG. 2) in which they are resident. The processor 250 (FIG. 2), based on the RR(V) of the vehicle 200 may, as described above, allow or not allow report.

Self-Measured Driving Score SMDS(V)

In an additional and optional embodiment, vehicles 110, 115, 120, 125, 128, 130 may be equipped with on-board diagnostic devices capturing physical characteristics of driving behavior. Such on-board diagnostic devices typically use built-in accelerometers, gyroscopes, GNSS antennas and so forth. The on-board diagnostic devices may additionally or alternatively be connected to the vehicle's internal networks (such as the internal networks of vehicles 110, 115, 120, 125, 128, 130) to gather information from other ECUs (i.e. electronic control units, as are known in the art) in the vehicle. By way of example, brake sensor 290 (FIG. 2) may comprise such on-board diagnostic devices. Said on-board diagnostic devices are known in the art, and are not expensive, they are used, inter-alia, by user based insurance companies (sometimes also called "pay as you drive insurance" and "pay how you drive insurance" and "mile-based auto insurance") and are deployed in many vehicles already on the road. The aforementioned on-board diagnostic devices can be used to calculate a Self-Measured Driving Score SMDS(V), which can be derived independently of S(V). It is appreciated, that the SMDS(V) is also, like S(V), a driving score which may be utilized by the system in a similar fashion.

Broadcasting Scores to Other Vehicles

The driving scores S(V) and SMDS(V) can be broadcast by V2V communications by one vehicle, for example the first vehicle 110, to neighboring vehicles 115, 120, 125, 128, 130. The scores may be broadcast either independently (i.e. S(V) is broadcast, and when it is available, SMDS(V) is also broadcast), or as some kind of weighted function, f(S(V), SMDS(V)) such as a harmonic average of S(V) and SMDS (V).

Figure 3:
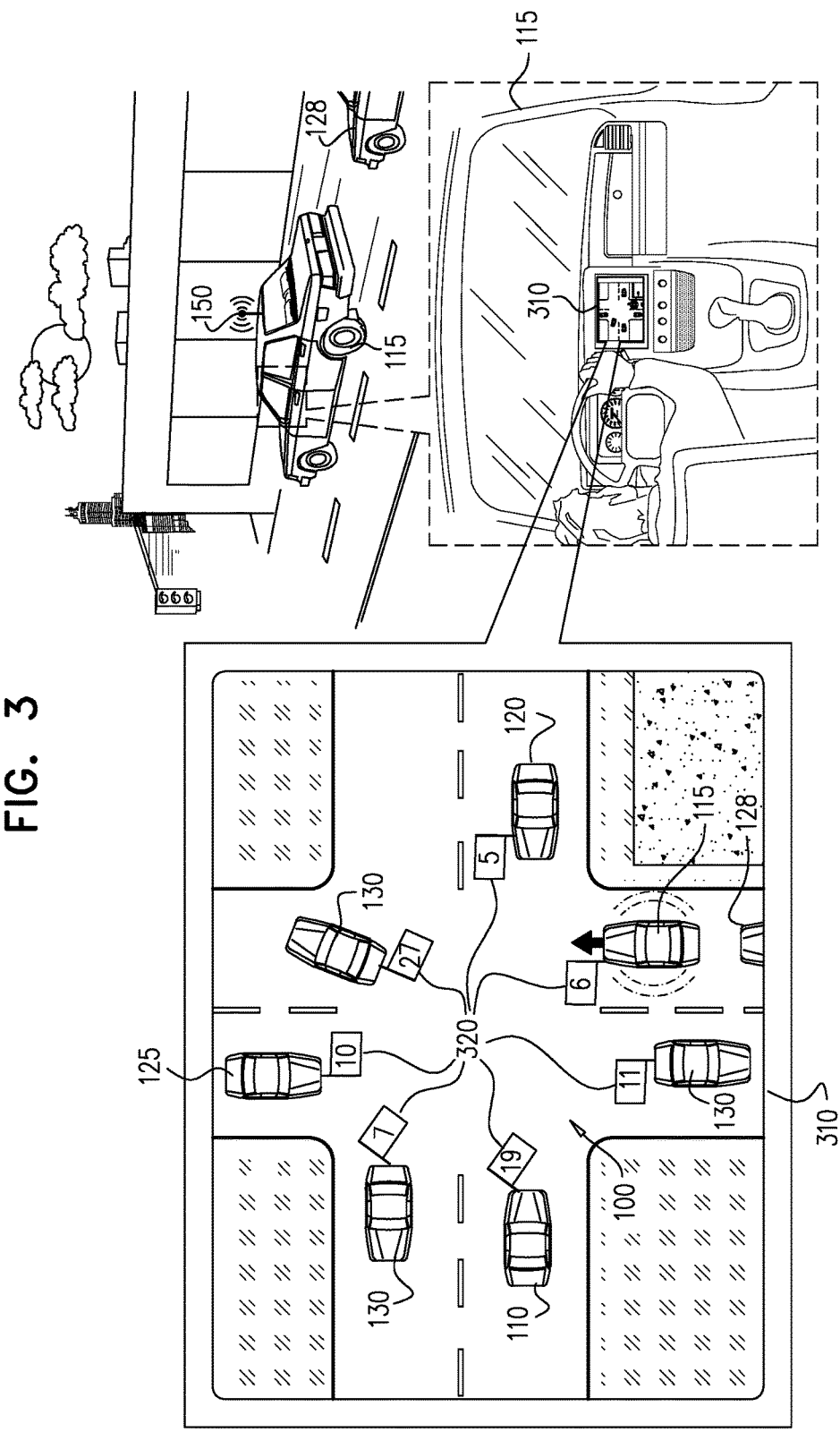
FIG. 3 is a simplified pictorial illustration of an in-vehicle display screen, showing ratings of neighboring vehicles in the system of FIG. 1.

Reference is now made to FIG. 3, which is a simplified pictorial illustration of an in-vehicle display screen 310, showing ratings of neighboring vehicles in the system of FIG. 1. FIG. 3 is an illustration from the point of view of the vehicle 115, in which the in-vehicle display screen 310 is situated. The display screen 310, (corresponding to screen 280 of FIG. 2) shows the position of the vehicle 115 in which the screen 310 is situated, the neighboring vehicles 120, 125, 128, 130 and their respective driving scores 320. This allows drivers to be alerted of reckless drivers (either based on S(V) or SMDS(V)) in their vicinity, in real time, enabling drivers to be aware of the potential associated danger. It is appreciated that FIG. 3 is exemplary, and the system described herein is applicable to most unsafe driving situations, for example, unsafe passing, speeding, and so forth.

The user interface 270 (FIG. 2) may also comprise an audio component (not depicted). The audio component may provide an audio alert to the driver if a vehicle with an extremely low S(V) enters the proximity of the vehicle 200 (FIG. 2) For example, vehicle 120 is depicted as having a driving score 320 of 5. Assuming, for the sake of this example that the driving score 320 of 5 is beneath a threshold for triggering audio alerts, when vehicle 120 enters short range communication range of vehicle 115, then the user interface 270 (FIG. 2) of vehicle 115 may trigger an audio alert.

Short-Term Vs Long-Term Scoring

Either of the scores S(V) or SMDS(V) may be replicated into different instances, wherein some scores act as short-term scores (such that they are reset periodically or updated over time so that they converge to some default score quite rapidly) and some scores act as long-term scores (such that they keep being updated over long periods of time without being reset—i.e. either no "leaky bucket" is implemented for long term scores, or the incrementing and decrementing of scores is adapted to be appropriate for the long term time scale in use). While short-term scores better reflect the behavior of the current driver and not of any other drivers sharing the same vehicle, long-term scores are better in statistically capturing the differences between careful and reckless drivers. By way of example, long-term scores may characterize the driving safety of a principle driver of a vehicle, assuming that other drivers over the long term are averaged out, while short-term scores reflect the driving safety of the current driver of the vehicle.

Central Servers

Figure 4:
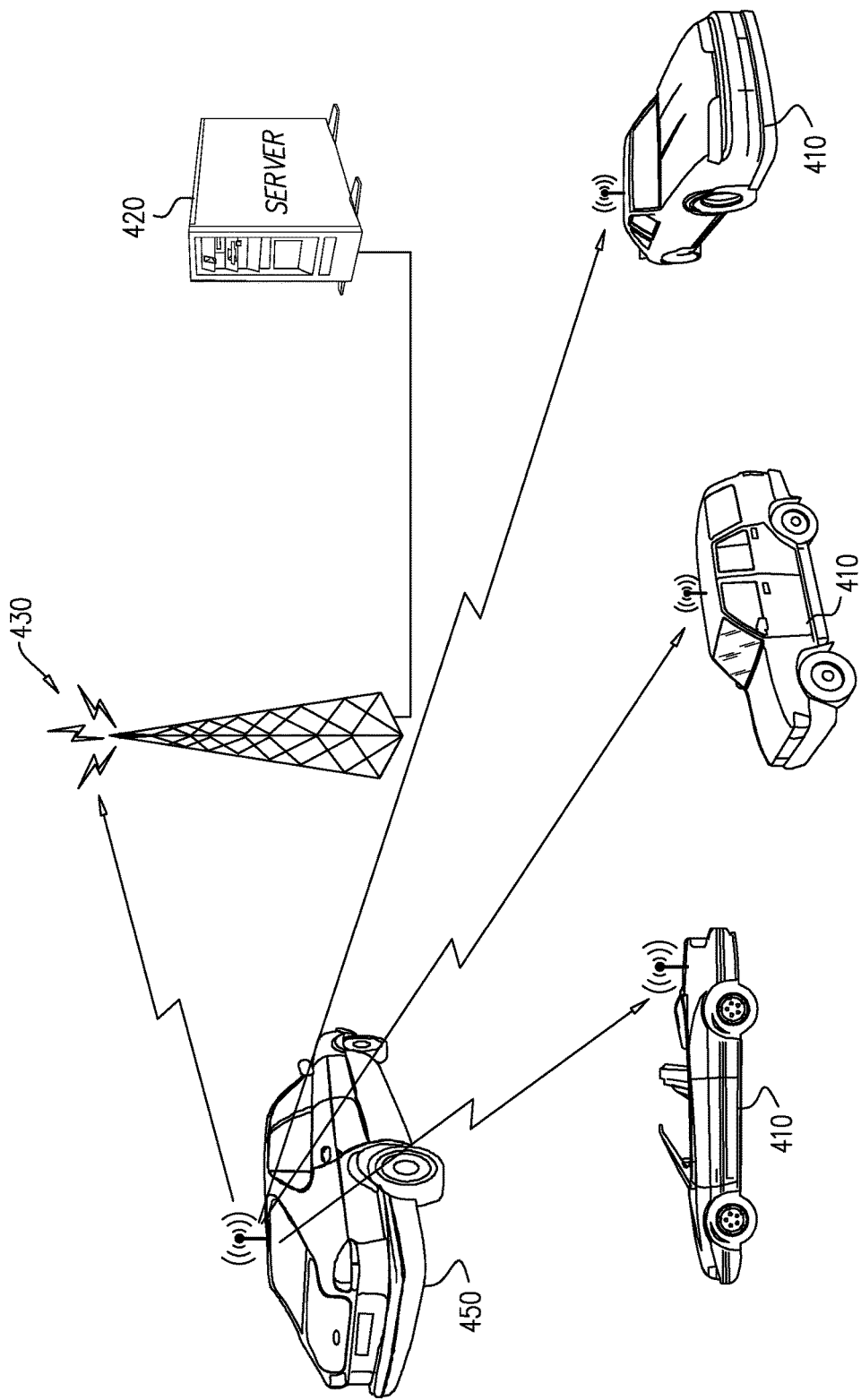
FIG. 4 is a simplified pictorial illustration of a plurality of vehicles interacting with a central server in the system of FIG. 1.

Reference is now made to FIG. 4, which is a simplified pictorial illustration of a vehicle 450 interacting with a central server 420 in the system of FIG. 1. As was noted above with reference to FIG. 2, the vehicle 200 (FIG. 2), corresponding to vehicle 450 of FIG. 4, may be connected to the central server 420 by a long range communication system 230 (FIG. 2) which typically incorporates wireless communication apparatus, such as an LTE modem cellular data connection 430, as is known in the art. In some embodiments, the reports of reckless driving may also be collected and analyzed by central servers, such as the central server 420. The central server 420 can be owned and operated by transport police, insurance companies, car pool managers, leasing companies and others. The report data collected at the central server 420 can be put to use by the owners of the central server 420 for monitoring driver behavior and taking appropriate action accordingly. Appropriate action may include, but is not necessarily limited to punitive action taken by police, managers of car fleets, and so forth, and raising of insurance rates by insurance companies.

By way of example, when a report of reckless driving is sent by the driver of vehicle 450, the report data is sent, typically via V2V communications to other vehicles of the plurality of vehicles 410. Additionally, the report of reckless driving may also be sent, via the cellular data connection 430, to the central server 420.

Alternatively, if the self-maintenance of each vehicle's S(V) score is managed as described above, then the resulting score is a statistical score that gradually converges to a score indicative of safe or reckless driving. If vehicles report their own scores, then this decentralized-computed score may be reported by each vehicle to the central server 420. The whole "who is in my vicinity" question is thus offloaded from the central server 420 and is carried out in a decentralized manner using V2V, as described above. Maintaining the driving score remotely and broadcasting the score locally benefits both CPU usage and network bandwidth. It is appreciated, however, that the reporting of its own S(V) score by a vehicle to the central server 420, which in turn reports the score to other vehicles in the vicinity of the self-reporting vehicle, may depend on communications which are not fast enough to deliver real-time updates. Accordingly, in such cases, embodiments where vehicles report their driving scores to neighboring vehicles may be implemented.

Figure 5:
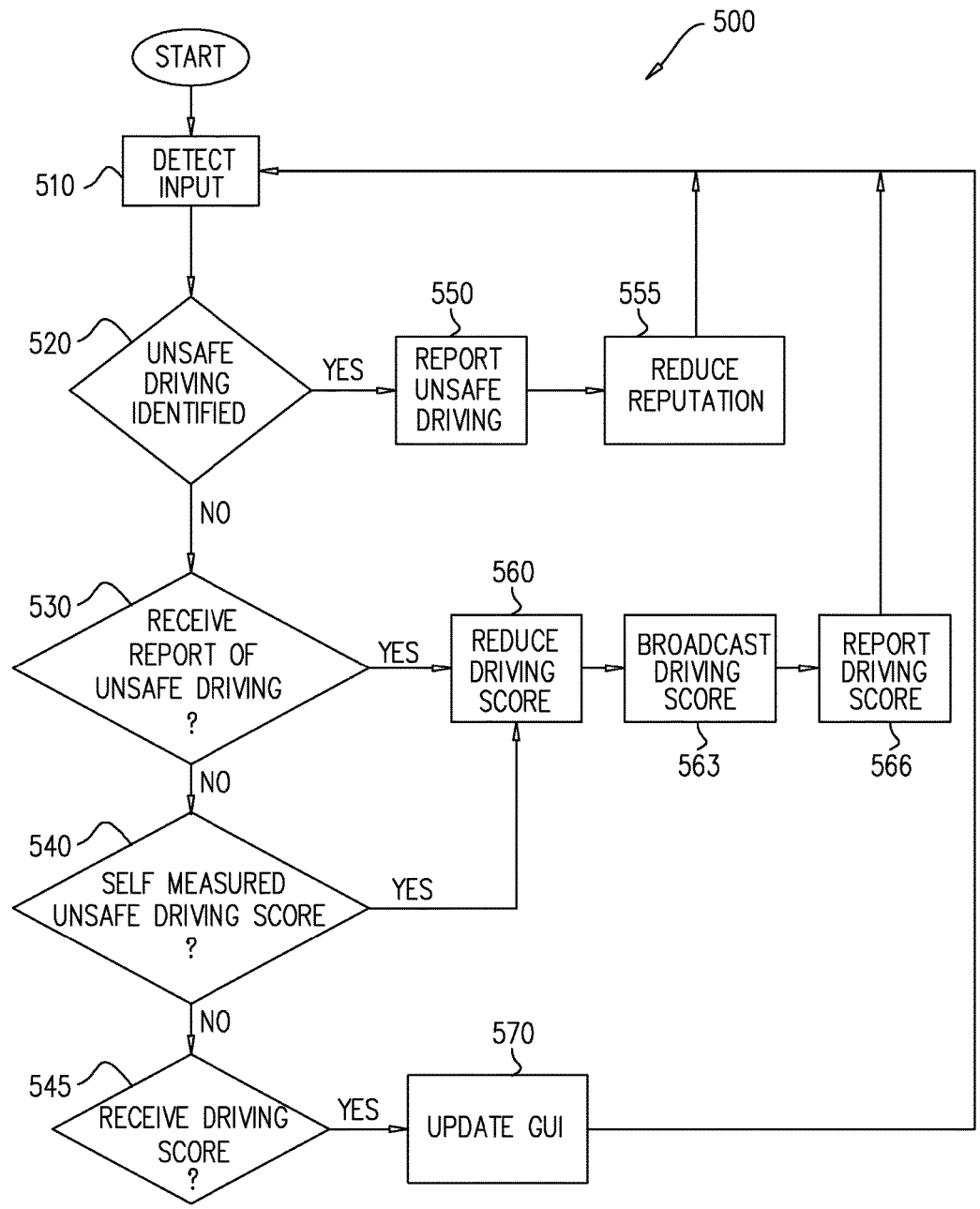
FIG. 5 is a flowchart of an exemplary process to be executed by one of the vehicles of FIG. 1.

Reference is now made to FIG. 5, which is a flowchart of an exemplary process 500 to be executed by one of the vehicles of FIG. 1. The process 500, which may be executed, for example, by processor 250 of FIG. 2, waits for an input (step 510). As will be described below, the input may be an input from the driver of the vehicle (step 520), such as the driver of vehicle 115, of FIG. 1. The input may also comprise receiving a communication from a neighboring vehicle (step 530), such as vehicle 110 of FIG. 1; a report of self-measured reckless driving (step 540); or receipt of a broadcast updated driving score from a neighboring vehicle (step 545).

The input received in step 510 may be an input from the driver of the vehicle (step 520), such as vehicle 115 of FIG. 1. For example, the driver of vehicle 115 of FIG. 1 may press the button indicating that an act of unsafe driving has occurred. The process 500 will utilize the short range communication system 220 of FIG. 2 to broadcast the report to neighboring vehicles (step 550). The process will also reduce the reputation of reports issuing from the vehicle (step 555). Process control is then returned to step 510, whereby the process 500 waits for an input. It is appreciated that in embodiments where the driver's report of unsafe driving specifies only a single vehicle, then the report will only be broadcast to the reported vehicle.

If the input received in step 510 is a communication from a neighboring vehicle received at the short range communication system 220 of FIG. 2 (step 530), said communication reporting an incident of reckless driving by the neighboring vehicle, then the process 500 will reduce its own driving score (step 560). As was noted above in the discussion of FIG. 1, the vehicle (e.g. vehicles 110, 115, 120, 125, 130 of FIG. 1) which is reducing its own driving score may or may not be the vehicle which committed the reported act of reckless driving received in step 530. The process will utilize V2V local communications to broadcasts its driving score to neighboring vehicles (step 563). The process 500 will optionally report the vehicle's new driving score to a central server (step 566), such as central server 420 of FIG. 4. Whether or not the process 500 reports the vehicle's new driving score, process control is then returned to step 510, whereby the process 500 waits for an input.

If the input received in step 510 is a report of self-measured reckless driving (step 540) from within the vehicle itself, that is the SMDS(V) described above, then steps 560-566 may be followed, as described for the case where the reported act of reckless driving was received from another vehicle.

If the input received in step 510 is a receipt of a broadcast updated driving score from a neighboring vehicle (step 545), then the process 500 may update the GUI (step 570), such as the user interface 270 of FIG. 2, where other vehicles and their corresponding driving scores are displayed.

Figure 6:
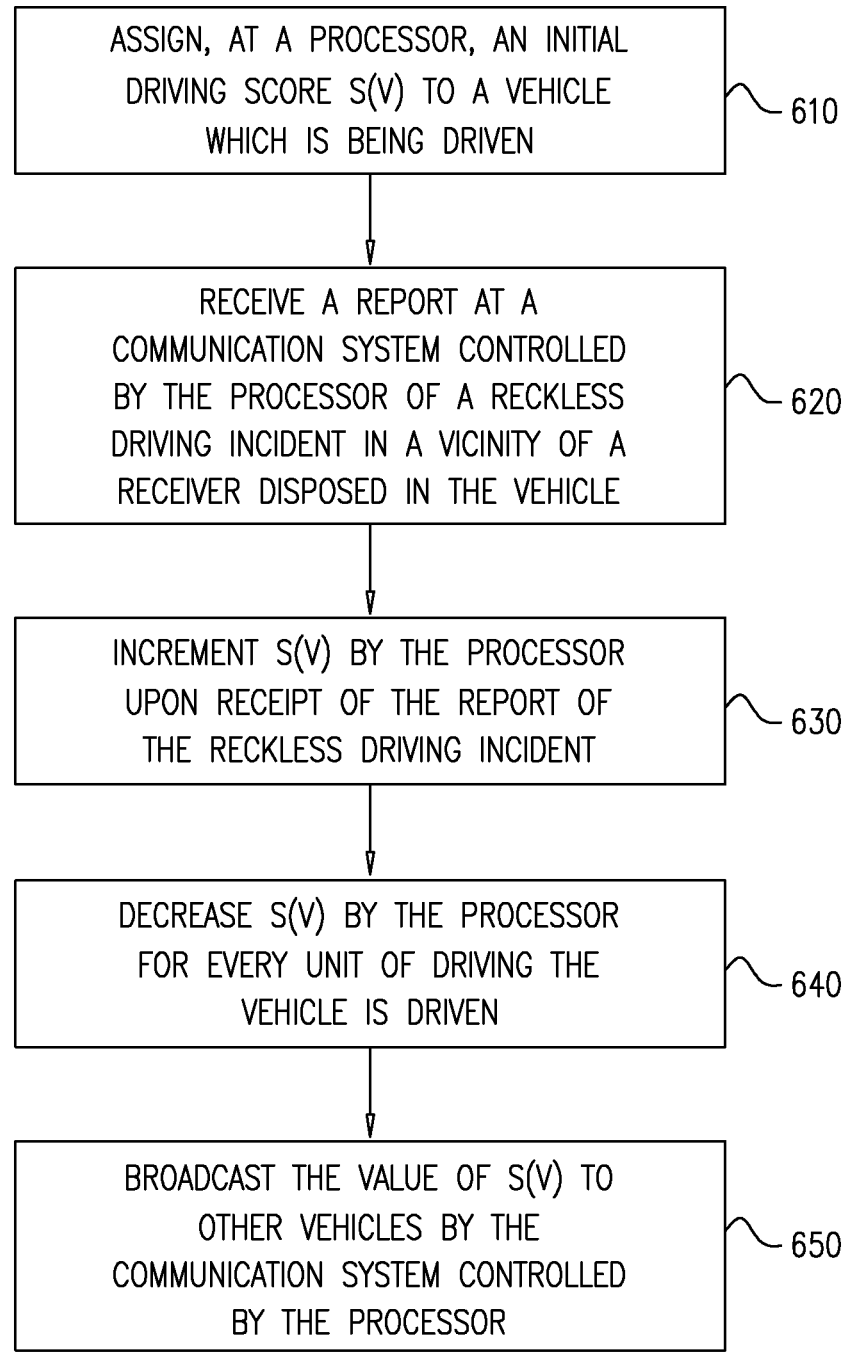
FIG. 6 is a flowchart of an exemplary method executed by one of the vehicles of FIG. 1.

Reference is now made to FIG. 6, which is a flowchart of an exemplary method executed by one of the vehicles of FIG. 1. The initial driving score S(V) is assigned by the processor 250 (FIG. 2) to the vehicle which is being driven (step 610). A report of a reckless driving incident in the vicinity of the vehicle is received at the short range communication system 220 of the vehicle (step 620). S(V) is incremented by the processor (FIG. 2) upon receipt of the report of the reckless driving incident (step 630). For every unit of driving driven by the vehicle, S(V) is decreased by the processor (step 640). The value of S(V) is broadcast to other vehicles by the communication system (step 650).

S(V) is incremented by the processor (FIG. 2) upon receipt of the report of the reckless driving incident (step 630). For every unit of driving driven by the vehicle, S(V) is decreased by the processor (step 640). The value of S(V) is broadcast to other vehicles by the communication system (step 650).

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method comprising:
    assigning at a processor an initial driving score S(V) to a vehicle V which is being driven;
    receiving a report at a communication system controlled by the processor, the report comprising a report of a reckless driving incident in a vicinity of the vehicle V;
    incrementing S(V) by the processor upon receipt of the report of the reckless driving incident;
    decreasing S(V) by the processor for every unit of driving the vehicle V is driven; and
    broadcasting the value of S(V) to other vehicles by the communication system controlled by the processor.

2. The method according to claim 1 wherein the unit of driving comprises a unit of time.

3. The method according to claim 1 wherein the unit of driving comprises a unit of distance.

4. The method according to claim 1 wherein the incrementing comprises linear incrementing.

5. The method according to claim 1 wherein the incrementing comprises non-linear incrementing.

6. The method according to claim 1 wherein the decreasing comprises linear decrementing.

7. The method according to claim 1 wherein the decreasing comprises non-linear decrementing.

8. The method according to claim 1 wherein a driver of a second vehicle generates the received report of the reckless driving incident.

9. The method according to claim 8 wherein the incrementing of S(V) comprises a function of a reputation of the driver of the second vehicle.

10. The method according to claim 9 wherein the reputation of the driver of the second vehicle is a function of the quality of reporting by the driver of the second vehicle.

11. The method according to claim 1 wherein S(V) is incremented or decremented based on reporting of on-board diagnostic devices of a second vehicle.

12. The method according to claim 1 wherein the report of the reckless driving incident is received from an on-board diagnostic device disposed in the vehicle V.

13. The method according to claim 12 wherein the broadcasting the value of S(V) comprises broadcasting a weighted function, f(S(V), SMDS(V)), where SMDS comprises a Self-Measured Driving Score, SMDS(V).

14. The method according to claim 12 wherein a Self-Measured Driving Score, SMDS(V), is derived in addition to S(V).

15. The method according to claim 1 wherein the processor controls a graphical user interface which displays a location of nearby vehicles.

16. The method according to claim 15 whereby the graphical user interface also displays a driving score of the nearby vehicles.

17. The method according to claim 15 whereby the graphical user interface is used to report an instance of reckless driving.

18. A system comprising:
    a processor operative to assign an initial driving score S(V) to a vehicle V which is being driven;
    a communication system controlled by the processor operative to receive a report, the report comprising a report of a reckless driving incident in a vicinity of the vehicle V;
    the processor being operative to increment S(V) upon receipt of the report of the reckless driving incident;
    the processor being operative to decrease S(V) for every unit of B driving the vehicle V is driven; and
    the communication system controlled by the processor being operative to broadcast the value of S(V) to other vehicles.

19. The system according to claim 18 wherein the unit of driving comprises a unit of time.

20. The system according to claim 18 wherein the unit of driving comprises a unit of distance.

* * * * *

UNITED STATES PATENT AND TRADEMARK OFFICE
CERTIFICATE OF CORRECTION

PATENT NO. : 9,767,689 B1  
APPLICATION NO. : 15/072378  
DATED : September 19, 2017  
INVENTOR(S) : Harel Cain et al.

Page 1 of 1

It is certified that error appears in the above-identified patent and that said Letters Patent is hereby corrected as shown below:

On the Title Page

Page 2, item (56) Other Publications, Line 14, "Sep. 29, 2005" to read as --Sep. 29, 2006--.

Page 2, item (56) Other Publications, Line 20, "Driving through" to read as --Driving Habits through--.

In the Specification

Column 9, delete Line 13 to Line 18.

In the Claims

Column 10, Claim 18, Line 50, "of B driving" to read as --of driving--.

Signed and Sealed this  
Twenty-fourth Day of October, 2017

Joseph Matal  
*Performing the Functions and Duties of the*  
*Under Secretary of Commerce for Intellectual Property and*  
*Director of the United States Patent and Trademark Office*